April 24, 1956

C. WHEATLEY 2,743,034

CLOSURE APPARATUS

Filed Feb. 18, 1953

INVENTOR.
Charles Wheatley
BY
C. M. McKnight
ATTORNEY

INVENTOR.
Charles Wheatley
BY
C. M. McKnight
ATTORNEY

United States Patent Office 2,743,034
Patented Apr. 24, 1956

2,743,034

CLOSURE APPARATUS

Charles Wheatley, Tulsa, Okla.

Application February 18, 1953, Serial No. 337,510

1 Claim. (Cl. 220—55)

This invention relates to a closure member normally utilized in open ends of pipelines and the like.

Conventional closure members used in the past by the pipeline industry involved considerable peripheral weight in the closure member in order to maintain the proper leverage in closing the member against the pipe and holding the pressure therein. This weight of necessity included heavy, multiple blind flanges and other material. Other types of securing means have also been utilized, such as snap locks for holding the closure member, acme threads and the like, but in every instance it is necessary to use a large casting involving considerable amount of weight which is bulksome, difficult to manufacture and dangerous.

The present invention is concerned with a closure member adapted for fitting on to the open ends of pipe, pressure vessels, and other like environment, for example, a pipe having an opening adjacent a full opening valve through which an opening is provided for scraper traps, and other cleaning articles which are to be moved through the pipe for cleaning purposes. It is to be understood that the present closure member is not limited to utilization in pipelines as scraper traps, but may be utilized with any pipeline or cylindrical body where a quick opening is desired, and particularly a quick opening closure member utilizing considerable less weight.

It is an important object of this invention to provide a closure member which includes a flange member adapted to fit on a pipe and cooperating with the closure member in order to provide an efficient sealing, as well as a quick opening and closing, of the closure member.

And still another object of this invention is to provide a closure member which is locked and forceably held against a fitting by a clamping ring which is easily and readily removable to effect a quick opening and closing of the member.

And still another object of this invention is to provide a combination closure member having a hinged connection working with a flange which eliminates the use of several steps in machining, such as threads and the like, and also eliminates the necessity of additional material, and yet withstand all the pressures and elements of weather with the assurance that the closure member will be quick opening and closing at all times.

And still another object of this invention is to provide a closure member which is efficient in operation, simple in construction and durable.

Other objects and advantages of the invention will be evident from the following detailed description, read in conjunction with the accompanying drawings, which illustrate my invention.

In the drawings:

Figure 2 is a perspective elevational view showing the closure member applied to the open end of a pipeline or the like.

Figure 1:
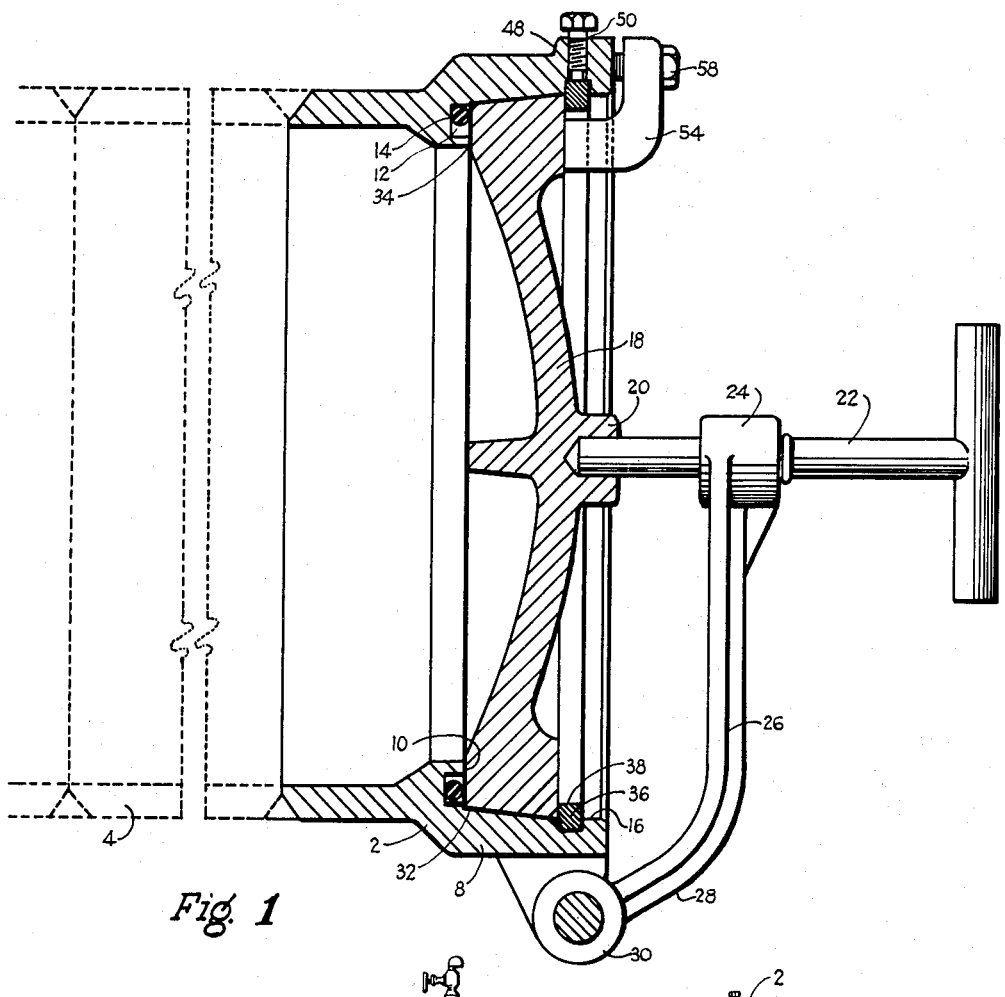
Figure 1 is a broken sectional elevational view showing the closure member cooperating with the special flange.
Figure 2:
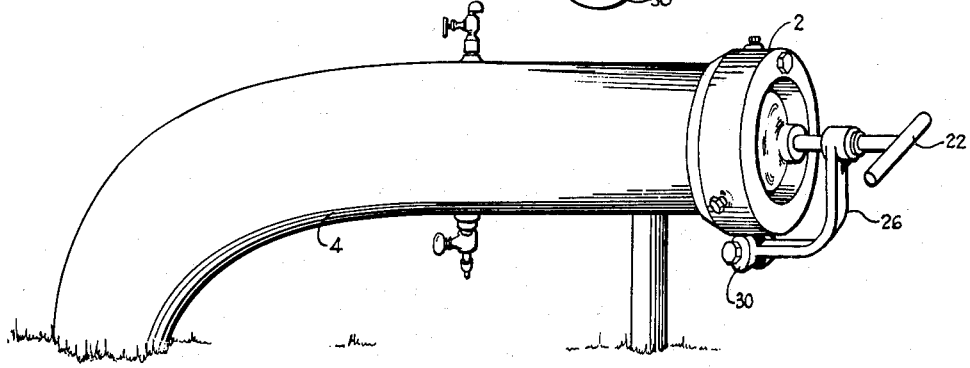

Referring to the drawings in detail, the closure member, particularly referring to Figs. 1 and 2, comprises a specially constructed flange designated by reference character 2 and adapted to be secured in any manner, such as welding or the like, to the end of a cylindrical pipe 4, or an upstanding cylindrical member 6 in a strainer opening of a pipeline which is of similar construction to a pressure vessel or the like. The flange member 2 is provided with a circular extension 8. A flat shoulder portion 10 is provided inwardly of the open end of the circular extension 8 and is provided with a countersunk recess 12 in which is disposed any suitable type synthetic rubber or plastic O-ring gasket 14 acting as a seal as will be hereinafter set forth.

Figure 3:
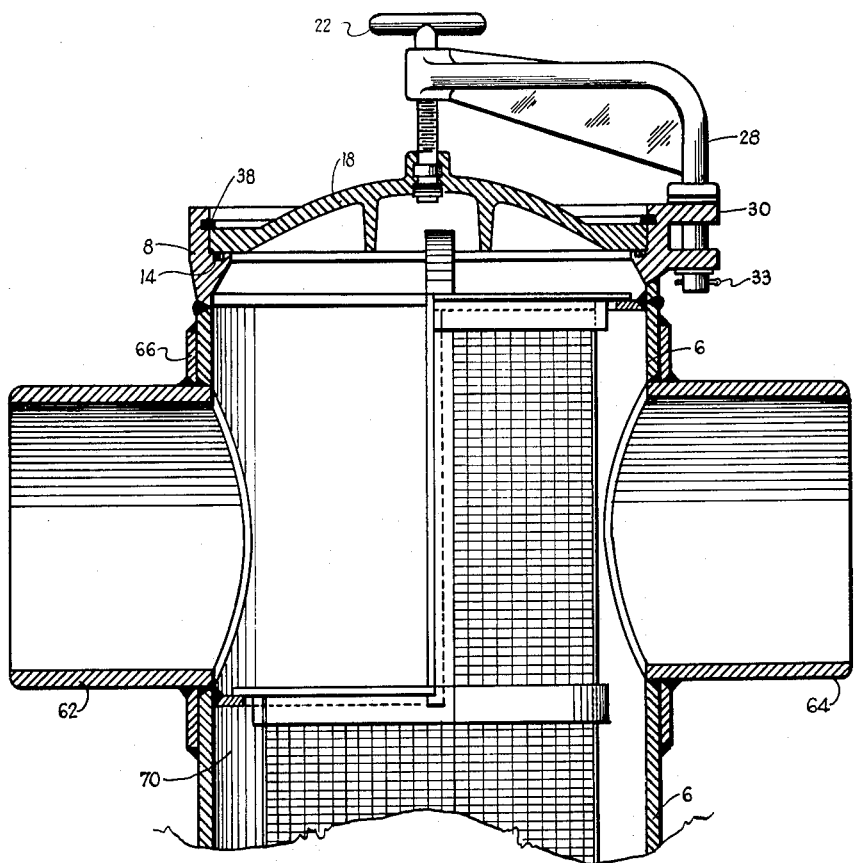
Figure 3 is a sectional elevational view of the closure member applied to a pressure vessel or the like such as a strainer opening for pipelines.

The inner periphery of the circular extension 8 is provided with a taper 16 directed inwardly and into which is adapted to fit a circular cover plate 18 in a manner shown in Figs. 1 and 2. The cover plate has a centrally disposed hub 20 into which is secured the handle member 22 connected by a bearing 24 with an arm 26 having a bent portion 28 cooperating with a hinge member 30. The hinge member is secured in any suitable manner along one point of the outer circumference of the flange 8 as is clearly shown in Fig. 2. It will be apparent that the hinge member can be disposed to permit swinging of the closure lid 18 radially away from the circular flange 8 (Fig. 2) or can be disposed to permit swinging movement such as that shown in Fig. 3 as will be hereinafter set forth. The hinge member is preferably secured together by a suitable bolt 31 (Fig. 4) or may utilize the bent portion 28 of the handle member as shown in Fig. 3 and secured in the hinge by a cotter pin 33. The outer periphery of the circular cover plate 18 is tapered as at 32 cooperating with the tapered seat portion 16 of the flange 8.

The bottom of the closure member 18 is provided with substantially flat surfaces 34 which cooperate with the O-ring gasket 14 clearly shown in Figs. 1 and 3 to provide an efficient sealing of the closure member when engaged with the flange. The inner periphery of the flange 8 at a point slightly below the open end thereof is provided with a circular groove or recess 36 adapted to receive a resilient C-ring member 38 having perpendicularly disposed flange members 40 and 42 (Fig. 4) at the opposite ends thereof. The flange members are provided with apertures (not shown) in alignment and adapted to receive a bolt 44 securely held thereto by nuts 46.

The circular flange extension 8 is provided with a plurality of circumferentially spaced boss members 48 having apertures 50 (Figs. 1 and 4) for the reception of a set screw 52.

It will be apparent that the screw 52 engages against the outer periphery of the snap ring 38 and in the event the snap ring becomes stuck or adheres to the surface of the groove 36 due to corrosion, moisture or other elements, the set screw 52 may be screwed inwardly to provide a release of the snap ring from its stuck position.

Figure 4:
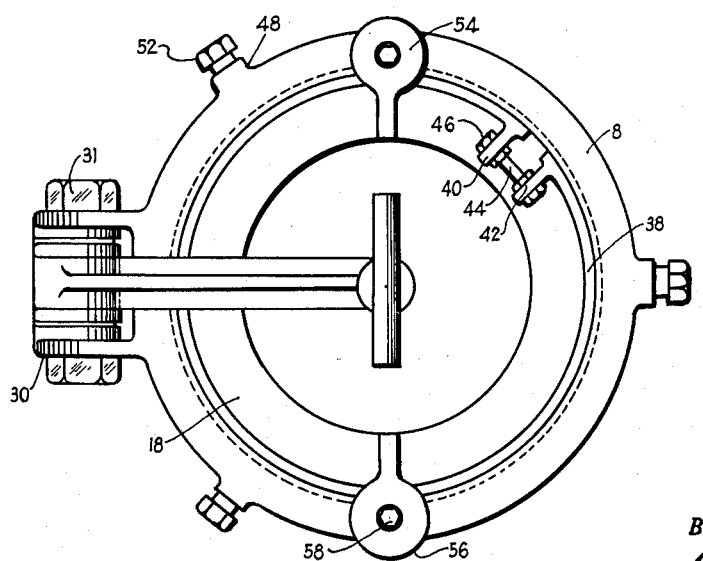
Figure 4 is a plan view of the closure member and the flange.

The closure member 18 is also provided with a pair of diametrically opposed circular flange members 54 and 56 (Figs. 1 and 4). Each of the flange members are provided with an aperture (not shown) for the reception of threaded studs 58 which extend into the outer end 60 of the flange 8. It will thus be seen that when the closure member is in place and before the insertion of the snap ring 38 for holding the closure member to be assured that the bottom flat surfaces 34 of the closure member 18 are in sealing contact with the O-ring 14, the studs 58 are threaded inwardly to direct the member 18 inwardly and align the member 18, thus assure an efficient sealing and fitting of the member.

In Fig. 3 is shown a slightly modified form of the environment of the closure member 18 wherein there is a cylindrical member 6 communicating with opposing pipe members 62 and 64. The top open portion of the cylindrical member 6 is provided with the flange fitting 8 in a manner similar to that of the preferred embodiment. The member 6 is re-enforced by a specially welded flange portion 66. A strainer member indicated generally at 70 is disposed within the container 6 and is utilized in a manner that is conventional to all pipeline strainers which may be removed from the strainer housing 6 at intermittent times for dumping the debris and the like accumulated therein. The flange fitting 8 is adapted to receive the closure member 18 in substantially the same manner as that disclosed in the preferred embodiment, in that the C-ring 38 is utilized to hold the closure member 18 in sealed engagement with the O-ring 14 in the groove 12 of the flange member, at the same time permitting easy and quick opening for removing the strainer element.

In Fig. 3 the studs 52 and 58 for the purposes set forth in the preferred embodiment are not shown, but it is apparent they may be utilized with the flange 8 if desired.

In the type of construction shown in Fig. 3 as heretofore mentioned, the closure member 18 may be swung transversely away from the opening by utilizing the hinge construction as mentioned.

Operation

When it is desired to close the member 18 in the end of a pipe, such as shown in Figs. 1 or 2, or a strainer vessel 6 or the like, such as that shown in Fig. 3, the flat surface 34 of the member 18 is brought into contact with the O-ring 14 and then the studs 58 are threaded downwardly to assure a tight fit or seal of the closure member 18 with the ring 14 and flange 8. The stud 44 is then turned in one direction to compress the C-ring 38, thereby decreasing its diameter so it may be disposed in the circular groove 36 of the flange 8. After insertion of the snap ring in the groove 36, the stud 44 is rotated in another direction permitting outward movement and expansion of the snap ring 38, thereby providing a tight fit within the groove 36 for holding the closure member in its sealed relationship with the flange 8.

From the foregoing, it will be apparent that the closure member is provided with an easy and quick opening and closing operation. Furthermore, its construction eliminates a considerable portion of excess material that is normally used in threaded closure members of this type. The facility with which the threaded stud 44 may be operated to insert or release the snap ring in the circular groove for holding the closure member is a simple construction which is easy to manufacture and operate. Furthermore, it is durable against the elements of weather. This one simple unit eliminates considerable threading and extra weight, yet permits an efficient and durable quick opening closure member of the type described.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In a closure apparatus for open ended chambers comprising in combination, an annular flange member secured to the end of the chamber, a substantially circular closure member hingedly secured to the annular flange member and cooperating therewith, a grooved shoulder portion in the annular flange, a tapered side portion for the grooved shoulder portion, a sealing ring disposed in said groove, a flat inner face on the closure member engaging the sealing ring in closed position, a tapered outer periphery for the closure member cooperating with the tapered side face of the grooved shoulder portion, an annular groove provided on the inner periphery of the annular flange, a contractable resilient C-ring, a flange member provided on each end of the C-ring, said second mentioned flange members having aligned apertures adapted to receive a bolt providing adjustment of the C-ring in the second mentioned groove adjacent the outer face of the closure member for clamping the member against the sealing ring and the grooved shoulder portion of the first mentioned flange, a plurality of circumferentially spaced apertured threaded bosses provided in the first mentioned flange, adjustable threaded means disposed in the bosses adapted to be moved into engagement against the C-ring to assist removal thereof, and outwardly extending flange members of substantially circular configuration carried by the closure member having adjustable means adapted to bear against the top face of the first mentioned flange member thereby firmly pressing the closure member into contact with the sealing ring.

References Cited in the file of this patent

UNITED STATES PATENTS

| | | |
|---|---|---|
| 668,926 | McGee | Feb. 26, 1901 |
| 728,692 | Fales | May 19, 1903 |
| 828,402 | Hart | Aug. 14, 1906 |
| 942,171 | Ecaubert | Dec. 7, 1909 |
| 1,140,535 | Schroeder | May 25, 1915 |
| 1,179,188 | Kanty et al. | Apr. 11, 1916 |
| 1,250,603 | Loepsinger | Dec. 18, 1917 |
| 1,432,591 | Carll | Oct. 17, 1922 |
| 2,298,511 | Rathbun | Oct. 13, 1942 |
| 2,552,053 | Miller | May 8, 1951 |
| 2,584,100 | Uecker | Jan. 29, 1952 |
| 2,586,033 | Haley | Feb. 19, 1952 |

FOREIGN PATENTS

| | | |
|---|---|---|
| 598,621 | Great Britain | of 1948 |